United States Patent
Tam

(10) Patent No.: US 10,013,952 B2
(45) Date of Patent: Jul. 3, 2018

(54) ADJUSTING BRIGHTNESS OF A DISPLAY BASED ON AN INTENSITY OF LIGHT REFLECTED BY A USER'S EYE

(71) Applicant: TELEFONAKTIEBOLAGET LM ERICSSON (PUBL), Stockholm (SE)

(72) Inventor: Edwin Tam, Shanghai (CN)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 125 days.

(21) Appl. No.: 15/305,212

(22) PCT Filed: Apr. 25, 2014

(86) PCT No.: PCT/CN2014/076181
§ 371 (c)(1),
(2) Date: Oct. 19, 2016

(87) PCT Pub. No.: WO2015/161495
PCT Pub. Date: Oct. 29, 2015

(65) Prior Publication Data
US 2017/0047046 A1     Feb. 16, 2017

(51) Int. Cl.
*G09G 5/10* (2006.01)
*G06F 3/01* (2006.01)
(Continued)

(52) U.S. Cl.
CPC ............... *G09G 5/10* (2013.01); *G01J 1/32* (2013.01); *G06F 3/013* (2013.01); *H04N 5/57* (2013.01);
(Continued)

(58) Field of Classification Search
CPC ............ G09G 5/10; G09G 2320/0626; G09G 2320/0646; G09G 2340/14;
(Continued)

(56) References Cited

U.S. PATENT DOCUMENTS 7,744,216 B1   6/2010   Uhlhorn
8,648,781 B2   2/2014   Barnhoefer et al.
(Continued)

FOREIGN PATENT DOCUMENTS

CN   103327172 A   9/2013
CN   203366711 U   12/2013

OTHER PUBLICATIONS

Epilepsy Action, "Computer and television screens," https://www.epilepsy.org.uk/info/photosensitive-epilepsy/computer-television-screens; pages generated on Nov. 10, 2016.
(Continued)

*Primary Examiner* — Ryan A Lubit
(74) *Attorney, Agent, or Firm* — Patent Portfolio Builders PLLC

(57) ABSTRACT

A device for adjusting a brightness of a display is provided. The device comprises means configured for receiving images from a digital camera, detecting an eye of a viewer in a current camera image, determining an intensity of a reflection of the display by the eye, and adjusting the brightness of the display based on the intensity of the reflection. Thereby, the brightness is adjusted based on the intensity of light which is emitted by the display and which actually is received by the eyes of the viewer. Further, a method of adjusting a brightness of a display, a corresponding computer program, and a corresponding computer program product, are provided.

13 Claims, 4 Drawing Sheets

(51) Int. Cl.
*G01J 1/32* (2006.01)
*H04N 5/57* (2006.01)
*H04N 5/58* (2006.01)
*H04N 21/4223* (2011.01)
*H04N 21/485* (2011.01)
*G06K 9/00* (2006.01)

(52) U.S. Cl.
CPC .......... *H04N 5/58* (2013.01); *H04N 21/4223* (2013.01); *H04N 21/4854* (2013.01); *G06K 9/00597* (2013.01); *G06K 9/00899* (2013.01); *G09G 2320/0626* (2013.01); *G09G 2320/0646* (2013.01); *G09G 2340/14* (2013.01); *G09G 2354/00* (2013.01); *G09G 2360/144* (2013.01); *G09G 2360/145* (2013.01); *G09G 2360/16* (2013.01)

(58) Field of Classification Search
CPC .. G09G 2360/16; G09G 2354/00; H04N 5/58; H04N 21/4854; H04N 21/4223; H04N 5/57; G06K 9/00899; G06K 9/00597
See application file for complete search history.

(56) References Cited

U.S. PATENT DOCUMENTS

| | | | | |
|---|---|---|---|---|
| 8,913,004 B1* | 12/2014 | Bozarth | ............. | G06K 9/00604 345/156 |
| 2007/0132663 A1* | 6/2007 | Iba | ......................... | G06F 3/013 345/8 |
| 2007/0285569 A1 | 12/2007 | Nakamura et al. | | |
| 2010/0097580 A1* | 4/2010 | Yamamoto | ........... | G02B 26/101 353/69 |
| 2011/0085139 A1 | 4/2011 | Blixt et al. | | |
| 2014/0104436 A1* | 4/2014 | Bork | ........................ | H04N 5/58 348/184 |
| 2014/0267771 A1* | 9/2014 | Lawler | ............... | G06K 9/00597 348/169 |
| 2015/0055808 A1* | 2/2015 | Vennstrom | .............. | G06F 3/167 381/307 |
| 2015/0269907 A1* | 9/2015 | Hadas | .................... | G09G 5/363 345/589 |
| 2016/0266643 A1* | 9/2016 | Martensson | ............. | G09G 3/20 |

OTHER PUBLICATIONS

Wilkins et al., "Treatment of photosensitive epilepsy using coloured glasses," Seizure, Dec. 1999, pp. 444-449, vol. 8, No. 8.
Extended European Search Report in corresponding European Application No. EP 14 89 0145 dated Mar. 17, 2017.
Supplementary Search Report in corresponding European Application No. EP 14 89 0145 dated Mar. 9, 2017.
H. Wang, et al.; "Separating corneal reflections for illumination estimation"; XP022703775; ScienceDirect, Nieurocomputing, vol. 71, No. 10-12; pp. 1788-1797; Jun. 1, 2008.
C. Nitschke, et al.; "Corneal Imaging Revisited: An Overview of Corneal Reflection Analysis and Applications"; XP055179676; Position Paper, IPSJ Transactions on Computer Vision and Applications; vol. 5; Jan. 2013; pp. 1-18.
International Search Report and Written Opinion dated Jan. 5, 2015 in related International Application No. PCT/CN2014/076181.

* cited by examiner

ADJUSTING BRIGHTNESS OF A DISPLAY BASED ON AN INTENSITY OF LIGHT REFLECTED BY A USER'S EYE

TECHNICAL FIELD

The invention relates to a device for adjusting a brightness of a display, a method of adjusting a brightness of a display, a corresponding computer program, and a corresponding computer program product.

BACKGROUND

Known techniques for adjusting the brightness of a display, such as a television set, a computer display, a display of a mobile phone or tablet, or the like, are based on adjusting the brightness in response to the output of one or more light sensors located close to the display. Optionally, the brightness of the display is also adjusted based on an average intensity of a video image which is rendered on the display.

The output received from such light sensors gives only a rough estimate of the light intensity in the vicinity of the display, and it does not reflect the intensity of light which actually is received by a viewer's eye. In addition, current solutions for dynamically adjusting the brightness of the display and that of external lighting in the display's environment suffer from a positive feedback loop between the external lighting and the light sensors.

U.S. Pat. No. 7,744,216 B1 discloses a solution for adjusting an intensity of a display based on measuring the dilation of a viewer's pupil. This solution suffers from the delay which is inherent to the dilation of the pupil. Moreover, it is not possible to determine that the dilation is caused by light emitted by the display.

SUMMARY

It is an object of the invention to provide an improved alternative to the above techniques and prior art.

More specifically, it is an object of the invention to provide an improved adjustment of a display's brightness.

These and other objects of the invention are achieved by means of different aspects of the invention, as defined by the independent claims. Embodiments of the invention are characterized by the dependent claims.

According to a first aspect of the invention, a device for adjusting a brightness of a display is provided. The device comprises means configured for receiving a sequence of images from a digital camera, detecting an eye of a viewer in a current image of the sequence of images, determining an intensity of a reflection of the display by the eye, and adjusting the brightness of the display based on the intensity of the reflection.

According to a second aspect of the invention, a method of adjusting a brightness of a display is provided. The method comprises receiving a sequence of images from a digital camera, detecting an eye of a viewer in a current image of the sequence of images, determining an intensity of a reflection of the display by the eye, and adjusting the brightness of the display based on the intensity of the reflection.

According to a third aspect of the invention, a computer program comprising computer-executable instructions is provided. The computer-executable instructions cause a device to perform the method according to an embodiment of the second aspect of the invention, when the computer-executable instructions are executed on a processing unit comprised in the device.

According to a fourth aspect of the invention, a computer program product comprising a computer-readable storage medium is provided. The computer-readable storage medium has the computer program according to the third aspect of the invention embodied therein.

For the purpose of elucidating the invention, the display may be any type of electronic display for rendering an image or a sequence of images, i.e., a video.

In particular, the display may be based on backlighting or may be edge-lit, utilizing a Light Emitting Diode (LED) or a Cold Cathode FLuorescent (CCFL) as light source, in combination with a Liquid-Crystal Display (LCD) providing a matrix of image elements which are controlled so as to render the image, as is known in the art. As an alternative, the display me be based on a matrix of light-emitting image elements. The display may be a television set, a computer display, a display of a mobile phone or tablet, or the like.

The invention makes use of an understanding that an improved control of the brightness of the display, i.e., the average light intensity which is emitted by the display for rendering images, can be achieved by determining the intensity of light which is emitted by the display and which actually is received by the eyes of one or more viewers gazing at the display, e.g., for watching a video which is rendered on the display. Thereby, it is possible to provide a viewer with an optimal, or at least improved, viewing condition resulting in a clearer picture and less eye-strain. In the prior art, display brightness is commonly adjusted based on light sensors which measure the intensity of light in the surrounding of the display. However, these light sensors cannot measure the intensity of light which actually is received by the viewer's eye. Known solutions which are based on measuring the dilation of a viewer's pupil reflect the intensity of light which actually is received by the viewer's eye, but are not able to discriminate different light sources which may cause the dilation of the pupil. In particular, it is not possible to determine that the dilation is caused by light emitted by the display, and adjusting the brightness of the display in response to a measured dilation of the pupil does accordingly not improve viewing conditions.

According to an embodiment of the invention, the means are further configured for determining an average intensity of ambient light, determining an average intensity of the display, and adjusting the brightness of the display based on the intensity of the reflection, the average intensity of the ambient light, and the average intensity of the display. The average intensity of ambient light is determined from the current camera image. The average intensity of the display is determined from an image currently rendered by the display. To this end, the average intensity of ambient light reflects the intensity of light which is emitted by one or more external light sources, such as lamps located in the vicinity of the display. Further, the average intensity of the display reflects the intensity of light which is emitted by the display when rendering the current image. Since the light emitted by the display contributes to the ambient light, an improved control of the display brightness is achieved by taking these two additional parameters into account.

According to an embodiment of the invention, the means are configured for adjusting the brightness of the display by calculating a static background illumination, calculating an intensity difference between the intensity of the reflection and the static background illumination, and adjusting the brightness of the display based on the calculated intensity difference. The static background illumination is calculated by subtracting from the average intensity of the ambient light the average intensity of the display. The static background illumination reflects the intensity of the ambient light in the vicinity of the display, excluding the contribution by light emitted by the display. Thus, the static background illumination is related to light emitted by one or more external light sources. Typically, if a video is rendered on the display, the intensity of the ambient light has a first component which is only varying slowly with time, which first component is related to light emitted by external light sources, e.g., lamps, and a second component which is due to the contribution of light emitted by the display. The variation of the second component with time is correlated with that of the average intensity of the display. By subtracting the second component from the average intensity of the ambient light, the relatively static contribution of external light sources can be determined. The static background illumination is then subtracted from the intensity of the reflection, resulting in a measure of the intensity of light emitted by the display and which actually is received by the eye of a viewer. Throughout this disclosure, this measure is referred to as intensity difference.

According to an embodiment of the invention, the means are configured for adjusting the brightness of the display based on a comparison of the calculated intensity difference to one or more threshold values. Such threshold values may, e.g., be pre-set by a manufacturer of the display, or configured by a user or viewer of the display. Thereby, the brightness of the display may be adjusted so as to achieve improved viewing conditions in accordance with viewer preferences.

According to an embodiment of the invention, the means are further configured for storing the calculated intensity difference in a history record, and adjusting the brightness of the display based on the stored intensity difference. This is advantageous in that the display brightness can be adjusted based on historical data. For instance, in order to avoid too rapid changes in brightness, values of the calculated intensity difference collected within a certain time interval may be taken into account, e.g., by adjusting the brightness based on an average calculated intensity difference.

According to an embodiment of the invention, the means are further configured for adjusting a brightness of an external light source. In other words, light sources other than the display which contribute to the ambient light are adjusted in order to improve the viewing conditions.

According to an embodiment of the invention, the means are configured for detecting a periodic fluctuation in the stored intensity difference and determining a frequency of the periodic fluctuation. The means are further configured for, if the determined frequency is within a pre-determined frequency range, adjusting the brightness of the display by reducing the brightness of the display, and adjusting the brightness of the external light source by increasing the brightness of the external light source. This embodiment is advantageous in that it mitigates triggering photosensitive epilepsy. The pre-determined frequency range may be 16 to 25 Hz, or any other range which is known to trigger epilepsy, and may optionally be configurable.

Even though advantages of the invention have in some cases been described with reference to embodiments of the first aspect of the invention, corresponding reasoning applies to embodiments of other aspects of the invention.

Further objectives of, features of, and advantages with, the invention will become apparent when studying the following detailed disclosure, the drawings and the appended claims. Those skilled in the art realize that different features of the invention can be combined to create embodiments other than those described in the following.

BRIEF DESCRIPTION OF THE DRAWINGS

The above, as well as additional objects, features and advantages of the invention, will be better understood through the following illustrative and non-limiting detailed description of embodiments of the invention, with reference to the appended drawings, in which.

All the figures are schematic, not necessarily to scale, and generally only show parts which are necessary in order to elucidate the invention, wherein other parts may be omitted or merely suggested.

DETAILED DESCRIPTION

The invention will now be described more fully herein after with reference to the accompanying drawings, in which certain embodiments of the invention are shown. This invention may, however, be embodied in many different forms and should not be construed as limited to the embodiments set forth herein. Rather, these embodiments are provided by way of example so that this disclosure will be thorough and complete, and will fully convey the scope of the invention to those skilled in the art.

Figure 1:
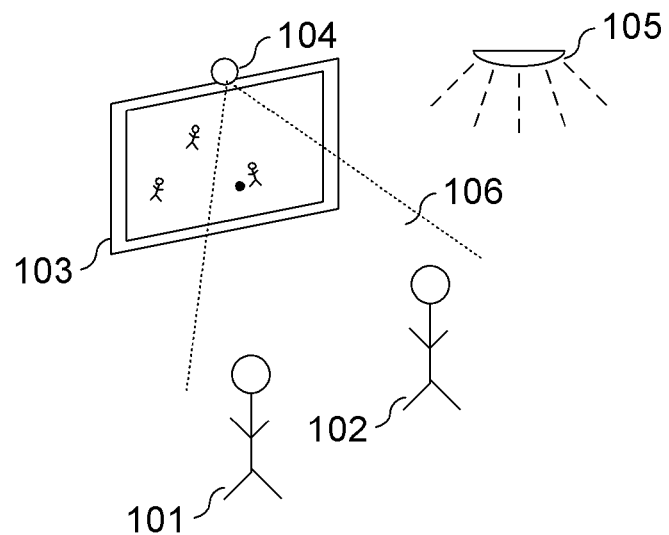
FIG. 1 illustrates an embodiment of the invention.

In FIG. 1, two viewers 101 and 102 gazing at a television set 103 provided with a digital camera 104 are illustrated, in addition to a lamp 105 as a source of ambient light in the area where viewers 101/102 and television set 103 are located. A video camera 104, which may be built into television set 103 or provided separately from it, is arranged for capturing video footage of the space 106 in front of television set 103 where one or more persons watching a video rendered on television set 103, such as viewers 101/102 watching a soccer game, are located.

Throughout the present disclosure, solutions for adjusting the brightness of a display, such as television set 103, are described. In the present context, the brightness of a display is to be understood as the average intensity of light emitted by the display over time. In displays which are back- or edge-lit, the brightness of the display may be changed by adjusting the intensity of the light source, e.g., the backlight, as is known in the art. It will be appreciated that embodiments of the invention are not limited to television sets, but encompass any apparatus comprising a light-emitting display.

Figure 2:
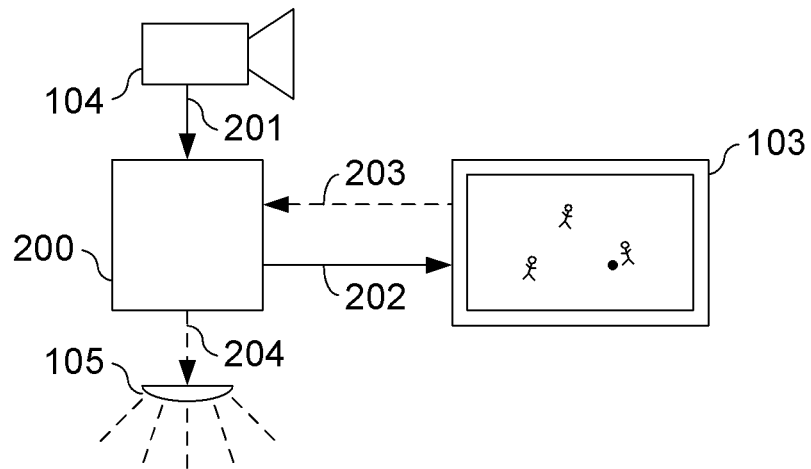
FIG. 2 shows a display, a digital camera, an external light source, and a device for adjusting the brightness of the display, in accordance with an embodiment of the invention.

In FIG. 2, an embodiment 200 of the device for adjusting the brightness of display 103, such as television set 103 shown in FIG. 1, is illustrated. Device 200 comprises means configured for receiving, via 201, a sequence of images from a digital camera 104, such as video camera 104 shown in FIG. 1, and adjusting, via 202, the brightness of display 103. Optionally, device 200 may further be configured for receiving, from display 103 via 203, an image or a sequence of images which currently are rendered by display 103. Further optionally, device 200 may be configured for adjusting, via 204, the brightness of an external light source 105, such as lamp 105 shown in FIG. 1. It will be appreciated that images from digital camera 104 and display 103 may be received by any kind of wired or wireless interface 201 and 203, respectively, as is known in the art. Likewise, adjusting the brightness of display 103 and external light source 105 may be effected through any kind of known wired or wireless interface.

Device 200 is configured for adjusting the brightness of display 103, and optionally the brightness of external light source 105, as is described in the following with reference to flow chart 300 shown in FIG. 3.

First, a current image is acquired 311 from digital camera 104. By means of image processing, one or more faces are detected 312 in the current image, and subsequently one or more irises are detected 313, as is known in the art. Then, one or more reflections are detected 314, and the intensity of the reflections is determined 315.

Figure 4:
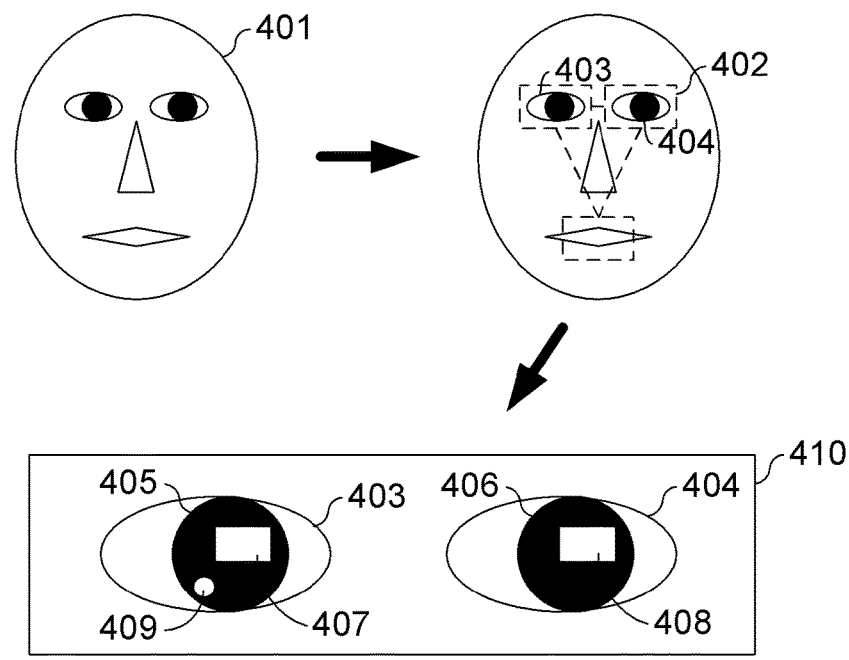
FIG. 4 illustrates detecting a reflection from the display by the eyes of a viewer, in accordance with an embodiment of the invention.

For the purpose of further elucidating the invention, these known steps of image processing are sketched in FIG. 4. First, a face 401 is detected 312 in a current image acquired from digital camera 104. Then, facial features 402 are identified, in particular the eyes 403 and 404, and a section 410 of the current camera image encompassing eyes 403/404 is identified for further processing. As a next step, an iris 405/406 of each eye 403/404 is detected 313, and a reflection 407/408 of display 103 by each eye 403/404 is detected 314 in the region of iris 405/506. Note that, in general, light is mostly reflected by the cornea of the human eye, and that it is easier to detect reflections in the dark region of the iris as compared to the white sclera.

Figure 3:
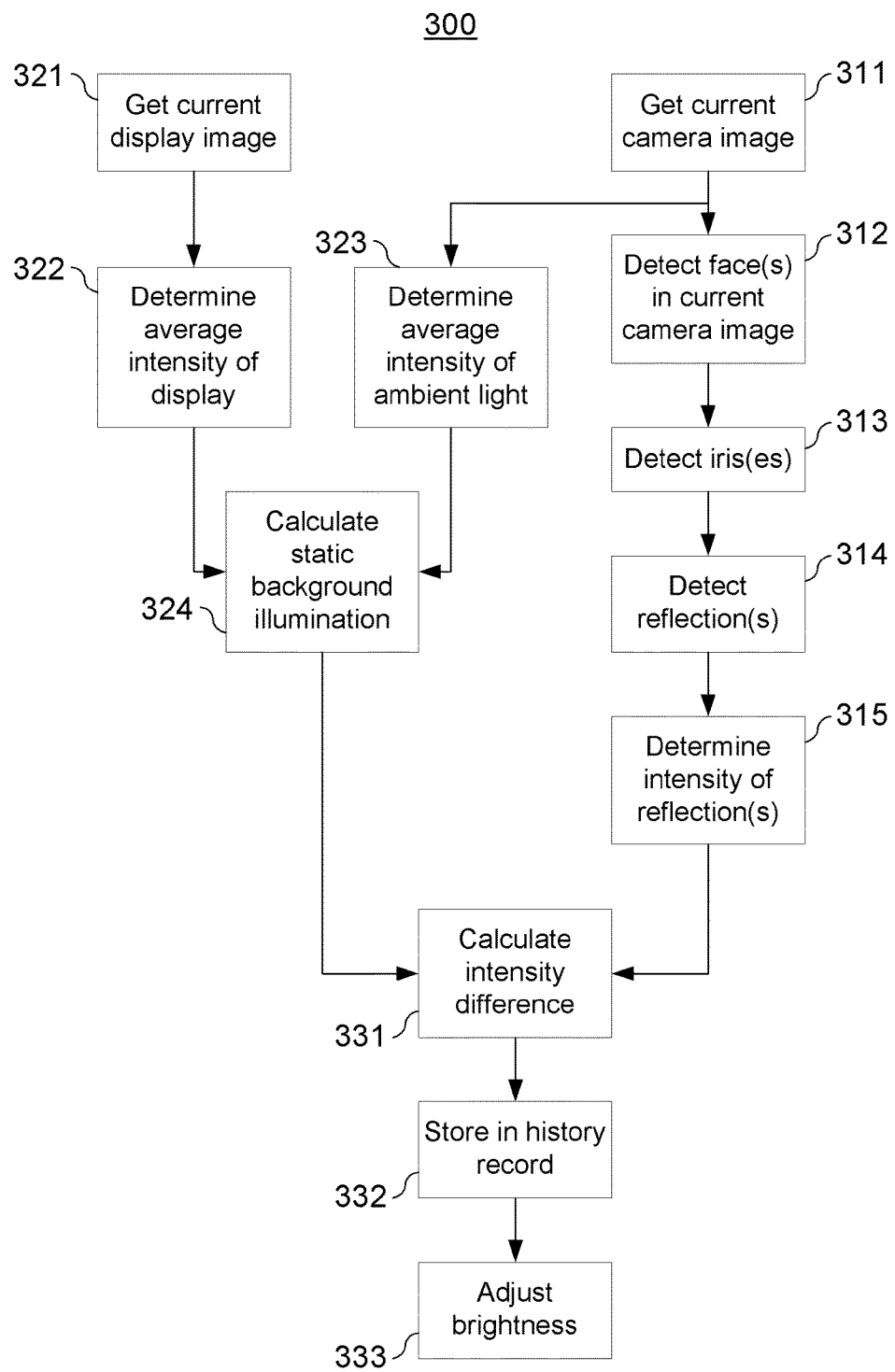
FIG. 3 illustrates adjusting the brightness of a display, in accordance with an embodiment of the invention.

Further with reference to FIG. 3, the intensity of reflections 407/408 is determined 315, e.g., by calculating an average intensity of all pixels within a respective region of reflections 407/408. Note that, in FIG. 4, a further reflection 409 stemming from a light source other than display 103, e.g., from external light source 105, is illustrated. Reflections which do not stem from display 103 are preferably not taken into consideration 314 for adjusting the brightness of display 103. Reflections which stem from display 103, such as reflections 407/408, may be distinguished 314 from reflections by external light sources in different ways. For instance, reflections having a shape which strongly deviates from a rectangular shape may be discarded. Alternatively, or additionally, since reflections stemming from display 103 reflect, in real-time, the picture which is currently rendered by display 103, they can be identified based on their intensity and/or color. For instance, by comparing the intensity of a reflection over time to the average intensity of display 103, reflections having an intensity which is correlated with that of the average intensity of display 103 may be identified 314. As a further example, reflections having the same, or similar, color as the picture which is currently rendered on display 103 may be identified 314. Thereby, only reflections 407/408 of light which is emitted by display 103 are taken into consideration for adjusting the brightness of display 103.

Figure 5:
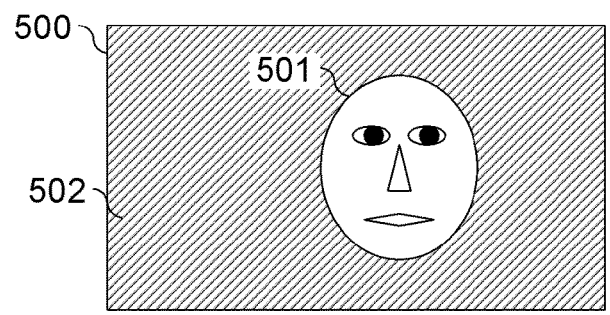
FIG. 5 illustrates determining the average intensity of ambient light, in accordance with an embodiment of the invention.

Further with reference to FIG. 3, a current image which is rendered by display 103 is acquired 321, and an average intensity of display 103 is determined 322 by calculating the average intensity of the current image. In addition, an average intensity of ambient light is determined 323. As is illustrated in FIG. 5, the average intensity of ambient light may be determined 323 by detecting a face 501 of the viewer in current camera image 500, and determining an average intensity of current camera image 500 excluding the detected face 501 (i.e., the shaded area 502 in FIG. 5).

Then, the static background illumination is calculated 324 as difference between the average intensity of ambient light, determined in step 323, and the average intensity of display 103, determined in step 322. The static background illumination is the contribution from light sources other than display 103, e.g., external light source 105.

In the next step, the intensity difference is calculated 331 as the difference between the intensity of the reflection, or reflections, determined in step 315, and the static background illumination, determined in step 324. The obtained intensity difference provides a measure of the light which is emitted by display 103 and which actually is received by viewer's 101/102 eye 403/404.

Based on the calculated 331 intensity difference, the brightness of display 103 is adjusted 333. Optionally, the calculated 331 intensity difference is stored 332 in a history record, e.g., a memory which device 200 is provided with, for later analysis. For instance, historical data may be taken into account in order to avoid too rapid changes in brightness, or for analyzing a time series of measured intensity differences for the purpose of detecting intensity fluctuations within a certain frequency range, as is discussed further below.

The brightness of display 103 may be adjusted 333 based on a comparison of the calculated intensity difference to one or more threshold values. For instance, the brightness of display may be increased 333 or decreased 333 if the calculated intensity difference becomes smaller or larger, respectively, than one or more threshold values. Further, if device 200 is configured for adjusting 333 the brightness of external light source 105, the brightness of external light source 105 may be increased 333 or decreased 333 if the calculated intensity difference becomes larger or smaller, respectively, than one or more threshold values. The threshold values may be pre-set by a manufacturer of display 103 or configurable by a user, e.g., viewer 101/102.

The brightness of display 103 may further be adjusted 333 in response to detecting a fluctuation in the calculated 331 intensity difference with a frequency which is known to trigger photosensitive epilepsy, typically in the range between 16 and 25 Hz. To this end, a periodic fluctuation in the stored 332 intensity difference is detected and a frequency of the periodic fluctuation is determined. If the frequency is within a certain range, the brightness of display 103 is reduced 333, and the brightness of external light source 105 is increased 333. Thereby, the risk of triggering photosensitive epilepsy among viewers 101/102 is mitigated. Optionally, the brightness of display 103 and external light source 105 are only adjusted if the change in calculated intensity difference, i.e., the amplitude, exceeds a threshold value.

It will be appreciated by the person skilled in the art that not all steps described hereinbefore are essential. Rather, embodiments of the invention maybe envisaged which only perform parts of these steps. For instance, an embodiment of the invention may be configured for adjusting the brightness of display 103 based on the intensity of reflection determined in step 315, i.e., without correcting the determined 315 intensity by the average intensity of display 103 (step 322) and/or the average intensity of ambient light (step 323). Further, an embodiment of the invention may be configured for adjusting the brightness of display 103 based on the most recently calculated intensity difference only, i.e., without taking historical intensity data into account.

In the following, embodiments of device 200 for adjusting a brightness of a display are described. Such embodiments may either be provided separately or integrated with the display.

Figure 6:
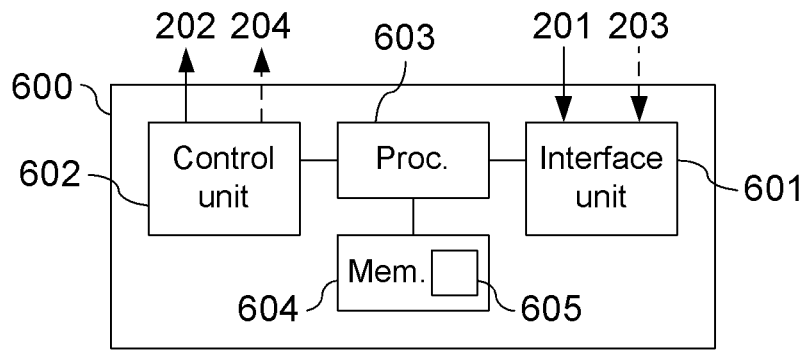
FIG. 6 shows a device for adjusting the brightness of a display, in accordance with an embodiment of the invention.

FIG. 6 shows an embodiment 600 comprising one or more interface units 601 for receiving images from a digital camera 104 (via 201 in FIG. 2) and, optionally, images which are rendered on display 103 (via 203), one or more control units 602 for adjusting the brightness of display 103 (via 202) and, optionally, the brightness of external light source 105 (via 204), a processing unit 603, and a memory 604. Memory 604 comprises a computer program 605 comprising computer-executable instructions, i.e., a software, for causing device 600 to implement an embodiment of the method according to the second aspect of the invention, when the computer-executable instructions are executed on processing unit 603. In particular, when executed, computer program 605 causes device 600 to receive (via 201 in FIG. 2 and interface unit 601) a sequence of images from digital camera 104, detect an eye of a viewer 101/102 in a current image of the sequence of images, determine an intensity of a reflection of display 103 by the eye, and adjust (via 202 and control unit 602) the brightness of display 103 based on the intensity of the reflection. Computer program 605 may further be configured for causing device 600 to perform optional or alternative steps described hereinbefore, in particular with reference to FIGS. 1 to 5. Processor 603 may be a general purpose processor, a Digital Signal Processor (DSP), an image processor, or the like. Interface unit(s) 601 and control unit(s) 602 may be implemented by means of electronic circuitry, as is known in the art, and may comprise any one, or a combination of, analog electronic circuitry, digital electronic circuitry, and processing means in combination with a suitable computer program.

Figure 7:
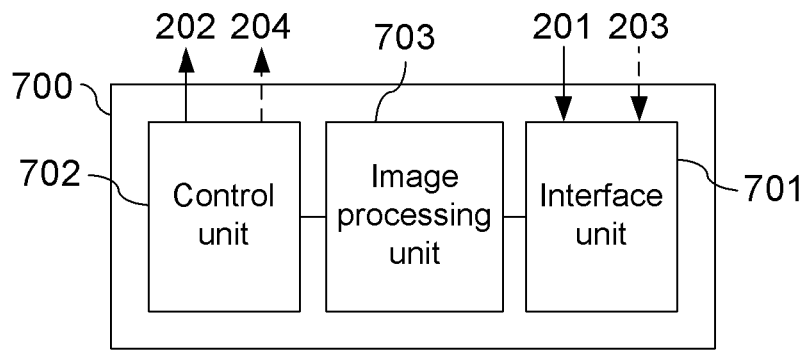
FIG. 7 shows a device for adjusting the brightness of a display, in accordance with another embodiment of the invention.

In FIG. 7, an alternative embodiment 700 of device 200 for adjusting a brightness of a display is illustrated. Device 700 comprises one or more interface units 701 for receiving images from a digital camera 104 (via 201 in FIG. 2) and, optionally, images which are rendered on display 103 (via 203), one or more control units 702 for adjusting the brightness of display 103 (via 202) and, optionally, the brightness of external light source 105 (via 204), and an image processing unit 703. Image processing unit 703 is configured for processing mages received from digital camera 104 and, optionally, images which are rendered on display 103. In particular, image processing unit 703 is configured for detecting an eye of a viewer in a current camera image received from digital camera 104 and determining an intensity of a reflection of display 103 by the eye. Interface unit(s) 701, image processing unit 703, and control unit(s) 702, may further be configured for causing device 700 to perform optional or alternative steps described hereinbefore, in particular with reference to FIGS. 1 to 5. Interface unit(s) 701, control unit(s) 702, and image processing unit 703, may be implemented by means of electronic circuitry, as is known in the art, and may comprise any one, or a combination of, analog electronic circuitry, digital electronic circuitry, and processing means in combination with a suitable computer program.

An embodiment of device 200, e.g., device 600 or 700, may be comprised in a display, such as display 103. The display may further comprise digital camera 104. The display may, e.g., be any one of a television set, a computer display, or a display of a mobile phone or tablet.

Figure 8:
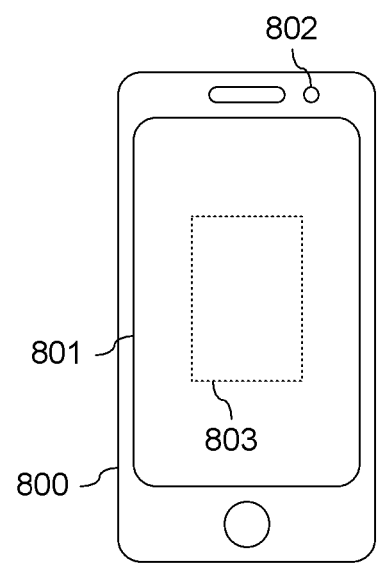
FIG. 8 shows a mobile phone, in accordance with an embodiment of the invention

As an example, a mobile phone 800 comprising a display 801, a digital camera 802, and an embodiment 803 of device 200 is shown in FIG. 8.

The person skilled in the art realizes that the invention by no means is limited to the embodiments described above. On the contrary, many modifications and variations are possible within the scope of the appended claims.

What is claimed is:

1. A device for adjusting a brightness of a display, the device comprising:
   a digital camera;
   wherein the device is configured to:
   receive a sequence of images from the digital camera,
   detect an eye of a viewer in a current camera image of the sequence of images from the digital camera,
   determine an intensity of a reflection of the visible light of the display by the eye, and
   adjust the brightness of the display based on the intensity of the reflection to improve viewing clarity and reduce eye-strain.

2. The device according to claim 1, the device being further configured to:
   determine an average intensity of ambient light from the current camera image,
   determine an average intensity of the display from an image currently rendered by the display, and
   adjust the brightness of the display based on the intensity of the reflection, the average intensity of the ambient light, and the average intensity of the display.

3. The device according to claim 2, the device being configured to adjust the brightness of the display by:
   calculating a static background illumination by subtracting from the average intensity of the ambient light the average intensity of the display,
   calculating an intensity difference between the intensity of the reflection and the static background illumination, and
   adjusting the brightness of the display based on the calculated intensity difference.

4. The device according to claim 3, the device being configured to adjust the brightness of the display based on a comparison of the calculated intensity difference to one or more threshold values.

5. The device according to claim 3, the device being further configured to:
   store the calculated intensity difference in a history record, and
   adjust the brightness of the display based on the stored intensity difference.

6. The device according to claim 1, the device being further configured to:
   adjust a brightness of an external light source in addition to adjusting the brightness of the display.

7. The device according to claim 6, the device being further configured to:
   detect a periodic fluctuation in the stored intensity difference,
   determine a frequency of the periodic fluctuation, and if the determined frequency is within a pre-determined frequency range, adjust the brightness of the display by reducing the brightness of the display, and adjust a brightness of the external light source by increasing the brightness of the external light source.

8. The device according to claim 1, the device being configured to determine the intensity of the reflection by:
   detecting an iris of the eye,
   detecting the reflection of the display by the eye within a region of the iris, and
   determining the intensity of the detected reflection.

9. The device according to claim 2, the device being configured to determine the average intensity of the ambient light from the current image by:
   detecting a face of the viewer, and
   determining an average intensity of the current image excluding the detected face.

10. The device according to claim 1, wherein the device includes a display selected from the group of: a television set, a computer display, or a display of a mobile phone.

11. A mobile phone comprising: the device according to claim 1 and the display.

12. A method of adjusting a brightness of a display, the method comprising:
   receiving a sequence of images from a digital camera,
   detecting an eye of a viewer in a current image of the sequence of images,
   determining an intensity of a reflection of the visible light of the display by the eye, and
   adjusting the brightness of the display based on the intensity of the reflection to improve viewing clarity and reduce eye-strain.

13. A non-transitory computer-readable medium comprising computer-executable instructions that cause a device to perform the method according to claim 12, when the computer-executable instructions are executed on a processing unit of the device.

* * * * *